June 11, 1963

G. SCHULZ 3,093,381

SHAFT SEAL

Filed July 7, 1961

INVENTOR.
George Schulz
BY
Hill, Sherman, Meroni, Gross & Simpson
ATTORNEYS

United States Patent Office 3,093,381
Patented June 11, 1963

3,093,381
SHAFT SEAL
George Schulz, Naperville, Ill., assignor to Gits Bros. Mfg. Co., Chicago, Ill., a corporation of Illinois
Filed July 7, 1961, Ser. No. 122,515
1 Claim. (Cl. 277—8)

The present invention relates to improvements in rotary shaft seals and more particularly to a rotary seal assembly operable at high speeds and over widely varying temperature ranges, and wherein the parts are very small and are easily removable and can be disassembled for repair or replacement.

An environment presenting problems of small space and wide temperature ranges is found in a pump utilized for circulating coolant in a pilot's cabin in an aircraft. In this installation high speeds are employed such as in the range of 8,500 to 11,000 r.p.m. Leakage must be avoided since the pumps may be positioned where leakage fluid will drip down on the pilot, and leakage will lose coolant from the system and the coolant may run into other operating parts. In this installation a very small space is available for the seal, consisting of a cylindrical bore or chamber coaxial with the shaft, and it is desirable that the seal be removable without withdrawing the pump shaft. The seal must be capable of operation over a temperature range of from −65° F. to 260° F. It is also essential in this installation that the seal face location be as close as possible to the bottom of the cylindrical chamber in the pump housing to allow as little runout and vibration as possible from the driving motor. Seals heretofore provided have proven unsatisfactory for the problems presented in the above environment and the problems have been solved by the seal of the present design. It will of course be understood that the features of the present seal may be employed in other environments with the same advantages being available.

It is accordingly an object of the present invention to provide an improved seal capable of operating in a very small space with zero leakage, and capable of operating over a wide temperature range at very high shaft speeds.

A further object of the invention is to provide an improved small seal which can be housed in a cylindrical chamber open at one end, and where the parts of the seal can be easily removed from the chamber.

A still further object of the invention is to provide an improved seal assembly which can be supported in a cylindrical chamber wherein a mating ring is employed having a sealing face close to the base of the chamber for non-vibrational stability, and wherein a rotatable sealing ring and spring are carried on a rotating shaft and the parts are stably driven in rotation with the shaft, and are easily disassembled from the shaft without its removal from the cylindrical chamber.

Other objects and advantages will become more apparent with the teaching of the principles of the invention in connection with the disclosure of the preferred embodiments thereof in the specification, claim and drawings, in which:

As shown on the drawings.

Figure 1:
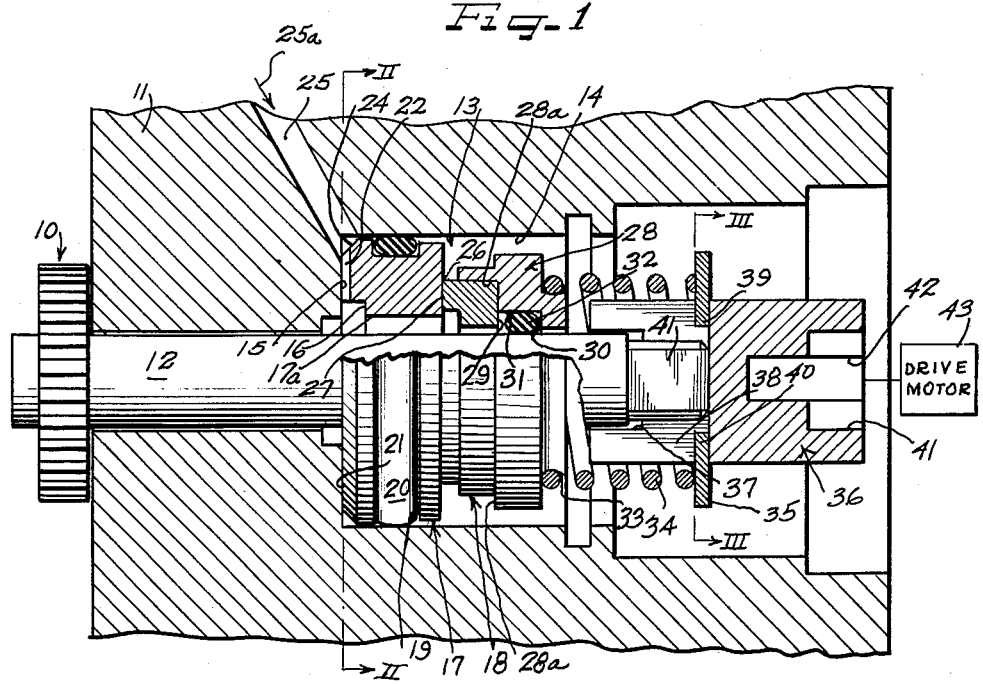
FIGURE 1 is a vertical sectional view, with certain parts partially sectioned, taken through the center of a seal assembly supported in operating position.

As illustrated in FIGURE 1, a pump assembly 10 is shown in part, being of the type for pumping a fluid such as a coolant for cooling aircraft cabins. The pump is a gear pump with only portions thereof shown and a portion of the housing is shown at 11 supporting a drive shaft 12 for the pump.

The housing is counterbored to form a small cylindrical chamber 13 concentric with the pump shaft 12. The cylindrical chamber has an outer cylindrical wall 14 and a radial end wall 15. This chamber 13 provides the available space for containing the seal. The seal includes a non-rotatable mating ring 17 rigidly seated in the base of the cylindrical chamber 13. The mating ring is sealingly engaged by a rotatable sealing ring 18 carried in rotation with the shaft 12.

The mating ring 17 has an annular outwardly facing groove 19 in which is positioned a resilient annular sealing member 20 preferably in the form of an O-ring, which sealingly engages the outer wall 14 of the cylindrical chamber.

Figure 2:
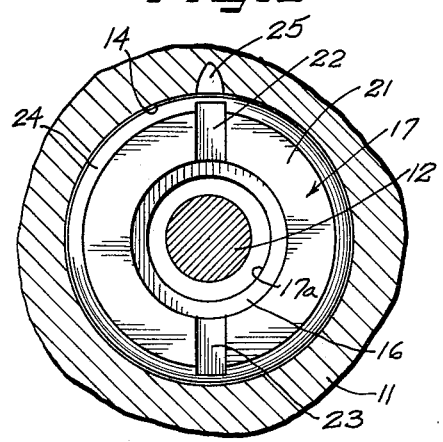
FIGURE 2 is a sectional view taken substantially along line II—II of FIGURE 1.

The mating ring 17 is firmly oriented and seated by its radial end support face 21 which engages the radial end wall 15 of the chamber. Cut in the support surface 21 are a pair of radial grooves 22 and 23, FIGURE 2, for conducting fluid to the interior of the seal. In the illustration shown, the fluid will be coolant flowing in the direction shown by the arrow 25a. This can be arranged by providing a small bleed line or "weep" opening from the pump discharge. The coolant will flow through the passage 25 in the housing, and around a channel formed by bevelling the end of the mating ring, as shown at 24. The coolant will then flow inwardly through the grooves 22 and 23, and pass through the opening between the inner surface 17a of the mating ring and the shaft 12, to lubricate the annular radial sealing faces 26 and 27. With this arrangement which permits the coolant to flow past the firmly based mating ring, the seal does not have to depend upon leakage fluid flowing along the pump shaft 12 to lubricate and cool the sealing faces.

The mating ring 17 is provided with a radial annular smooth sealing face 26 and the sealing 18 is provided with a similar annular smooth sealing face 27 in sealing engagement with the face 26. The sealing ring is formed of carbon or similar material providing long wearing life in engagement with a metal mating ring, and it is supported on a carrier ring 28. The seal is disassembled by removing the carrier ring 28 and sealing ring axially off the end of the shaft, as will later be described, and the mating ring 17 is constructed for ease of withdrawal from the cylindrical chamber 13. The mating ring is provided with an inner annular surface 17a which is sufficiently large so as to provide a space between it and the outer surface of the shaft 12. An annular groove 16 is cut into the surface 21 of the mating ring at the inner edge thereof so as to receive a removing tool. Such a tool will be slid along through the space within the surface 17a with prongs projecting outwardly to engage the shoulder formed by the groove 16, and the mating ring can be pulled axially from the chamber 13.

A resilient annular seal 32, such as an O-ring, seals the carrier ring 18 with respect to the shaft 12, and also provides a centering support for the carrier ring and its supported sealing ring 18. The O-ring 32 is positioned within an annular inwardly facing surface 31 on the carrier ring, and between a back radial surface 29 of the sealing ring and a radial surface 30 of the carrier ring. Thus a convenient groove is formed by the surfaces of the carrier ring and the sealing ring, and the sealing ring is conveniently supported in the carrier ring by an axially extending recess 28a cut into the inner surface 31 concentric with the carrier ring 28.

The O-ring 32 is slidable on the shaft so as to permit the sealing ring 18 to move against the mating ring 17 by action of a coiled compression spring 34, and to slide forwardly on the shaft with wear of the sealing ring 18. The spring 34 is securely mounted on a radially outwardly facing slightly concave surface 33 on the back end of the mating ring 28. This provides a fixed coaxial support for one end of the spring 34, and also provides a non-rotatable relationship between the spring and the mating ring. This reduces the tendency of the parts to spin or rotate relative to each other due to their different inertias with acceleration or deceleration of the shaft 12. The close fit between the spring and the mating ring also prevents the tendency toward vibration at high speeds which would cause chattering and disturbances which may break the sealing integrity between the faces 26 and 27.

Figure 3:
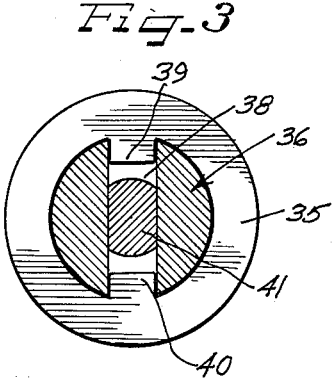
FIGURE 3 is a sectional view taken substantially along line III—III of FIGURE 1.

The shaft is driven by a coupling 36 and for convenience of drive, for convenience of disassembly, and to utilize the space available, a backing ring 35 for the spring 34 is mounted on the coupling. As shown in FIGURES 1 and 3, the coupling has a central bore 37 to receive the end of the shaft 12, and a lateral slot 38 is formed in the end of the coupling to effect a driving relationship with the shaft by receiving the extreme end 41 of the shaft which is provided with flattened sides. The transverse slot 38 also functions as a drive for the spring backing ring 35, and the ring is provided with inner recessed portions to form spaced tongues or projections 39 and 40 which extend into the transverse slot 38. The sides of the tongues 39 and 40 engage the sides of the transverse slot so that the backing ring is positively driven with the coupling and with the shaft and cannot rotate relative thereto with acceleration or deceleration of the shaft. The rear end of the spring 34 stably engages the washer 35 but is not attached thereto to allow for relative slight rotational shifting of the parts to prevent rotational tension in the spring 34.

The coupling is symmetrical with respect to its two ends so that it can be reversed, having a bore 41 at the other end with a transverse slot 42, and the coupling is driven by a drive motor 43 for driving the pump.

The seal assembly is stable and the mating ring will not tend to rotate in the cylindrical chamber with the rotation of the shaft as has been the tendency of seals heretofore available. The mechanism is capable of rotating at high speeds and over extreme temperature ranges without losing its sealing integrity.

The sealing ring is formed in an integral unit so that the coupling can be pulled off the end of the shaft with the spring backing ring 35, and the remaining sealing ring sub-assembly will be in one piece, including the sealing ring 18, the carrier ring 28, the spring 34, and the support and sealing O-ring 32. This sub-assembly can be easily pulled from the shaft by hooking a tool over the forwardly facing shoulder 28a on the carrier ring. This leaves the chamber free for the insertion of a removal tool inside of the mating ring 17.

Thus it will be seen that I have provided an improved seal capable of operation in a very small place, and capable of easy disassembly, which meets the objectives and advantages above set forth.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

A rotary seal assembly for removable insertion into a chamber having a cylindrical wall and a radial end wall and for fitting over the end of a shaft projecting from the chamber, said seal comprising a mating ring having an annular radial sealing face and an inner annular surface spaced from the shaft for the insertion of a removal tool and having a radial support face parallel to said sealing face and positioned on the end of the seal opposite said sealing face for engaging the end wall of the chamber and determining the position of the mating ring, an annular outwardly facing groove on the mating ring, an annular resilient seal in said groove for sliding along the outer wall of the cylindrical chamber when the mating ring is inserted and for sealing against the outer wall of the chamber, a bevelled edge formed on the outer edge of the mating ring joining said support face, means defining a radially extending groove in said support face for communicating with a passage leading into said cylindrical chamber so that fluid can flow outwardly past said support face, a removing tool groove at the inner edge of said support face, the inner periphery of the mating ring being larger than the shaft for the insertion of a removing tool between the shaft and mating ring to engage said tool groove, a rotatable sealing ring having an annular radial face for sealingly engaging the sealing face of the mating ring, a carrier ring for supporting the sealing ring on the shaft, an inwardly facing annular groove on the carrier ring defined by a circumferential surface on the carrier ring, further defined by a radial surface on the carrier ring, and further defined by a radial surface on the rotatable sealing ring, an annular resilient seal within the groove in the carrier ring for resiliently engaging the shaft, a radially outwardly facing spring support surface on the carrier ring, a coil compression spring having one end locked over said spring support surface, a backing washer engaging the other end of said spring, a driving end for said shaft having flattened radial surfaces, a drive coupling having a radially extending groove with flat surfaces for engaging the drive surfaces of the shaft, and inwardly projecting tongues on said washer projecting into said coupling groove for driving the washer with the coupling in rotation, said washer locked axially to the coupling for providing a backing for the spring.

References Cited in the file of this patent

UNITED STATES PATENTS

| | | |
|---|---|---|
| 2,192,588 | Heckert | Mar. 5, 1940 |
| 2,640,736 | Wahlmark | June 2, 1953 |
| 2,680,031 | Barr | June 1, 1954 |

FOREIGN PATENTS

| | | |
|---|---|---|
| 6,257 | Great Britain | Mar. 13, 1913 |